(12) United States Patent
Gentile et al.

(10) Patent No.: US 12,092,483 B2
(45) Date of Patent: Sep. 17, 2024

(54) SENSOR SHIELD

(71) Applicant: Lonza Biologics, Inc., Portsmouth, NH (US)

(72) Inventors: Matthew Gentile, Dover, NH (US); Alexandra Jackson, Rye, NH (US); Zaid Haddadin, Somersworth, NH (US); Kevin Mason, Dover, NH (US)

(73) Assignee: Lonza Biologics, Inc., Portsmouth, NH (US)

( * ) Notice: Subject to any disclaimer, the term of this patent is extended or adjusted under 35 U.S.C. 154(b) by 157 days.

(21) Appl. No.: 17/765,132

(22) PCT Filed: Oct. 19, 2020

(86) PCT No.: PCT/US2020/056321
§ 371 (c)(1),
(2) Date: Mar. 30, 2022

(87) PCT Pub. No.: WO2021/080918
PCT Pub. Date: Apr. 29, 2021

(65) Prior Publication Data
US 2022/0373368 A1     Nov. 24, 2022

Related U.S. Application Data

(60) Provisional application No. 62/924,870, filed on Oct. 23, 2019.

(51) Int. Cl.
*G01D 11/24* (2006.01)
(52) U.S. Cl.
CPC .................. *G01D 11/245* (2013.01)

(58) Field of Classification Search
CPC .................................................. G01D 11/245
See application file for complete search history.

(56) References Cited

U.S. PATENT DOCUMENTS

| | | | |
|---|---|---|---|
| 4,830,713 A | 5/1989 | Gagescu | |
| 8,568,575 B2 * | 10/2013 | Talutis | G01N 27/26 204/286.1 |
| 2010/0176559 A1 * | 7/2010 | Wakeham | F16J 15/062 277/626 |

FOREIGN PATENT DOCUMENTS

| | | | | |
|---|---|---|---|---|
| CN | 202329832 U | * | 7/2012 | |
| CN | 203704963 | | 7/2014 | |
| CN | 203704963 U | * | 7/2014 | |
| CN | 203942084 | | 11/2014 | |
| CN | 203942084 U | * | 11/2014 | |
| CN | 204027754 U | * | 12/2014 | |
| CN | 113161802 A | * | 7/2021 | |
| GB | 2033583 | | 5/1980 | |

OTHER PUBLICATIONS

International Search Report and Written Opinion for PCT/US2020/056321 dated Jan. 29, 2021, 24 pages.

* cited by examiner

*Primary Examiner* — Jamel E Williams
(74) *Attorney, Agent, or Firm* — Dority & Manning, P.A.

(57) ABSTRACT

A sealing assembly for forming a liquid-tight seal around a component is provided. The sealing assembly includes an end cover, a sleeve, a gasket, and a sealing clamp. Provided is also a holder that cooperates with an end cover of the sealing assembly to maintain the component and sealing assembly in a generally horizontal position for a period of time.

18 Claims, 13 Drawing Sheets

SENSOR SHIELD

RELATED APPLICATIONS

The present application is the National Stage entry of International Patent Application No. PCT/US2020/056321 filed on Oct. 19, 2020, which is based on and claims priority to U.S. Provisional Patent application Ser. No. 62/924,870, filed on Oct. 23, 2019, which are incorporated herein by reference.

BACKGROUND

Sensors, such as pH sensors, dissolved oxygen sensors, capacitance sensors, conductivity sensors, and oxidation-reduction potential sensors are utilized across a variety of fields for measuring and detecting certain conditions in vessels, pipes, flow-through chambers, and the like. For instance, fields such as chemistry, biotech, pharmaceutical, and food and beverage all generally require the use of one or more sensors during production or quality control testing, for example.

While many applications within these industries and others have begun the transition to single-use products, sensors generally remain configured to be reusable. However, outside of clean-in-place (CIP) applications, many sensors have proven to be difficult to clean due to the sensitive electrical components contained in the sensor. Therefore, while being configured for repeat use, many sensors are discarded after each use due to concerns of product carryover and cleanability. This problem is further acerbated by the fact that manual cleaning is often inefficient, ineffective, or requires expensive and time-consuming equipment.

Therefore, it would be beneficial to provide a solution to one or more of the above problems. For instance, it would be a benefit to provide a liquid-tight assembly for protecting the electrical components of a component to be cleaned, such as a sensor, that leaves the remainder of the component exposed. It would further be an improvement to provide a liquid-tight assembly that can be used with many or most existing sensors. Furthermore, it would also be beneficial to provide an assembly that protects the electrical components of a component and that also is shaped and sized so as to be compatible with a standard parts washer, such as an automated parts washer, in one aspect. It would further be an improvement to provide an assembly that is removably affixed to the component while remaining liquid-tight.

SUMMARY

The present disclosure may generally be directed to a sealing assembly for providing a liquid-tight seal around a component during a cleaning process. The sealing assembly includes, in one aspect, an end cover, a sleeve, a sealing gasket, and a sealing clamp. The end cover has a first end and a second end, where the first end includes an opening and the second end is fully enclosed and a cavity extends from the opening towards the second end. The sealing assembly also includes a sleeve having a first end and a second end, where the sleeve includes an opening in the first end and an opening in the second end, and defines a cavity therebetween. Further, the cavity in the end cover and the cavity defined by the sleeve are aligned and configured to accept a component therein.

In a further aspect, the end cover, the sleeve, or both the end cover and the sleeve include a base having a groove that extends circumferentially around the base of the respective sleeve or end cover. Furthermore, in an aspect, the end cover, the sleeve, or both the end cover and the sleeve include a projecting portion that extends from the base to the second end of the respective sleeve or end cover. Moreover, in one aspect, the diameter of the base of the sleeve, the end cover, or both the end cover and the sleeve is about 1.5 times an inner diameter of the projecting portion of the respective end cover or sleeve, or greater. In one aspect, the inner diameter of the projecting portion of the sleeve, the end cover, or both the end cover and the sleeve is about 15 mm or greater. Further, in an aspect, the diameter of the base of the sleeve, the end cover, or both the end cover and the sleeve is about 35 mm or greater. In a further aspect, the projecting portion of the end cover has a length from the first end to the second end of about 25 mm to about 75 mm. Moreover, in one aspect, the projecting portion of the sleeve has a length between the first end and the second end of about 1 mm to about 25 mm.

Additionally or alternatively, in one aspect, the gasket includes a ridge that extends circumferentially around the gasket. In an aspect, the ridge is seated in the groove of the end cover, the sleeve, or both the end cover and the sleeve.

In yet another aspect, the sealing assembly also includes a holder. In an aspect, the holder includes on or more apertures having a diameter of about 17.5 mm to about 45 mm.

The present disclosure may also be generally directed to an apparatus for cleaning a sensor containing an electrical component. The apparatus includes a sealing assembly and a holder. The sealing assembly contains an end cover, a sleeve, a sealing gasket, and a sealing clamp. The end cover includes a first end and a second end, where the first end has an opening and the second end is fully enclosed, where a cavity extends from the opening towards the second end. The sleeve has a first end and a second end, where the sleeve includes an opening in the first end and an opening in the second end, and defines a cavity therebetween. Furthermore, the cavity in the end cover and the cavity defined by the sleeve are aligned and configured to accept a component therein.

In one aspect, the holder of the apparatus includes one or more apertures having a diameter of about 17.5 mm to about 45 mm. Further, in an aspect, the end cover has a projecting portion with an outer diameter of about 17.5 mm to about 45 mm. In a further aspect, the end cover is releasably retained in an aperture of the holder.

Nonetheless, the present disclosure is also generally directed to a method of cleaning a component that requires a liquid-tight seal. The method includes assembling a sealing assembly on a component by placing a component through a cavity in a sleeve having a first end and a second end, where the sleeve includes an opening in the first end and an opening in the second end, and a cavity defined therebetween, placing a sealing gasket over a component, placing a distal end of the component into a cavity in an end cover having a first end and a second end, where the first end includes an opening and the second end is fully enclosed, and where the cavity extends from the opening towards the second end, and, placing a clamp around the sleeve, the sealing gasket, and the end cover.

Additionally or alternatively, in one aspect, the end cover is releasably retained in an aperture of a holder. Moreover, in an aspect, the holder maintains the component in a generally horizontal position. In yet a further aspect, after assembling the sealing assembly, the component is placed into an automated washer.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
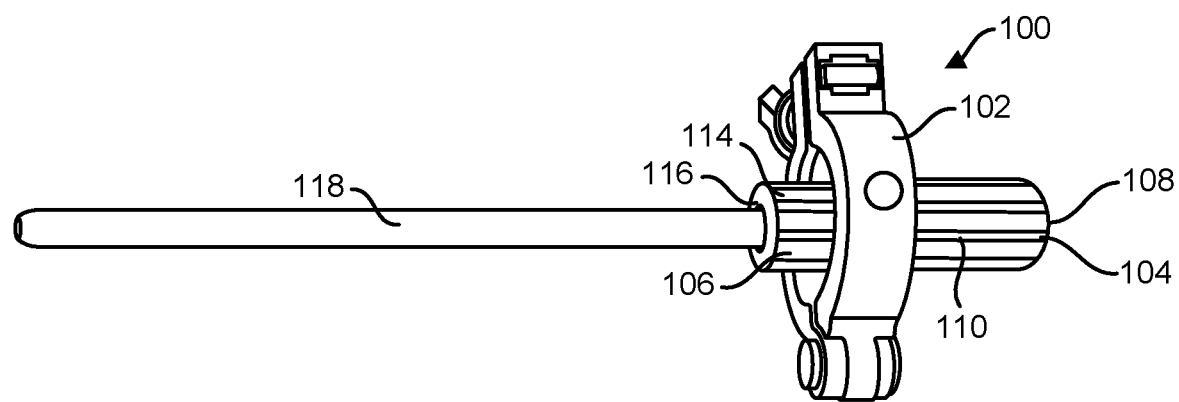
FIG. 1 is a top view of one aspect of a sealing assembly on a component according to the present disclosure.

Repeat use of reference characters in the present specification and drawings is intended to represent the same or analogous features or elements of the present invention.

Definitions

It is to be understood that the terminology used herein is for the purpose of describing particular embodiments only and is not intended to limit the scope of the present invention. In this specification and in the claims that follow, reference will be made to a number of terms that shall be defined to have the following meanings:

As used herein, the terms "about," "approximately," or "generally," when used to modify a value, indicates that the value can be raised or lowered by 10% and remain within the disclosed embodiment.

DETAILED DESCRIPTION

It is to be understood by one of ordinary skill in the art that the present discussion is a description of exemplary embodiments only, and is not intended as limiting the broader aspects of the present disclosure.

Generally speaking, the present disclosure is directed to a sealing assembly that includes an end cover having a fully enclosed end, a sleeve, a sealing gasket, and a sealing clamp. Moreover, in a further aspect, the present disclosure may also generally be directed to sealing assembly and a holder configured to releasably accept at least a portion of the end cover, where the holder is configured to maintain a component and a sealing assembly in a generally horizontal position, such as in an automated parts washer during a cleaning cycle. Furthermore, the present disclosure may also be generally directed to a method of cleaning a component, such as a sensor. For instance, the sleeve is placed over the component with a base end facing a distal end of the component, a sealing gasket is placed between the sleeve and the distal end of the component, and an end cover is placed over the distal end of the component with a base facing the base of the sleeve. Particularly, the present disclosure has found that, by carefully configuring a sealing assembly according to the present disclosure, a sealing assembly for a sensor may be formed that is one size fits many or most while still remaining liquid-tight.

For instance, in one aspect, the sealing assembly includes an end cover having a base and a projecting portion. The projecting portion includes a first end having an opening and a second end that is fully enclosed where a cavity extends from the opening towards the second end. In one aspect, the base is configured to cooperate with either a base of a sleeve or a sealing gasket, or both a base of a sleeve and a sealing gasket, in order to provide a liquid-tight seal around a distal end of a component, such as a sensor (e.g. an end of a component distal from the measurement end, or the end at which the electrical components to be protected are located). For instance, the end cover may be shaped and sized so as to have an open end, and a fully enclosed end, so as to be releasably provided over a distal end of a component.

Furthermore, in one aspect, the projecting portion of the end cover may have a generally cylindrical shape, where one end is enclosed and the other, opposite end, is connected to the base. Of course it should be understood that the end cover may also have a variety of cross sections, such as square, oval, rectangular, and the like, and in one aspect, may have a cross section selected based upon the cross section of the sensor or component to be covered. Generally speaking, the base may have the same cross section, but not necessarily the same diameter or width, as the projecting portion, but in one aspect, the base and the projecting portion may be selected to have different cross sections.

Regardless of the cross section selected, in an aspect, the base may generally have a diameter (or width if a non-circular cross section is used) that is about 1.5 times the diameter of the inner diameter of the projecting portion or greater, such as about 2 times the diameter of the inner diameter of the projecting portion or greater, such as about 2.3 times the diameter of the inner diameter of the projecting portion or greater.

Notwithstanding the ratio of the diameters, in one aspect, the projecting portion may have an inner diameter (or width) of about 15 mm or greater, such as about 17.5 mm or greater, such as about 20 mm or greater, such as about 22 mm or greater, such as about 40 mm or less, such as about 35 mm or less, such as about 32.5 mm or less, such as about 30 mm or less, such as about 27.5 mm or less, or any ranges or values therebetween, and, in one aspect, may have an inner diameter of about 20 mm to about 25 mm.

Furthermore, the projecting portion may have an outer diameter of about 17.5 mm or greater, such as about 20 mm or greater, such as about 22 mm or greater, such as about 25 mm or greater, such as about 30 mm or greater, such as about 45 mm or less, such as about 40 mm or less, such as about 35 mm or less, such as about 32.5 mm or less, such as about 30 mm or less, such as about 27.5 mm or less, such as about 25 mm or less, or any ranges or values therebetween, and, in one aspect, may have an outer diameter of about 20 mm to about 30 mm.

In one aspect, the base may have a diameter of about 35 mm or greater, such as about 40 mm or greater, such as about 45 mm or greater, such as about 50 mm or greater, such as about 70 mm or less, such as about 65 mm or less, such as about 60 mm or less, such as about 55 mm or less, or any ranges or values therebetween, and, in one aspect, may have a diameter of about 45 mm to about 55 mm.

Regardless of the cross section and diameter selected, in one aspect, the projecting portion may have a length from the first end adjacent to the base to the fully enclosed second end of about 25 mm or greater, such as about 30 mm or greater, such as about 35 mm or greater, such as about 40 mm or greater, such as about 42.5 mm or greater, such as about 75 mm or less, such as about 70 mm or less, such as about 65 mm or less, such as about 60 mm or less, such as about 55 mm or less, such as about 50 mm or less, such as about 45 mm or less, or any ranges or values therebetween, and, in one aspect, may have a length of about 35 mm to about 50 mm.

Furthermore, in one aspect, the base of the end cover may also include a groove located around the circumference or edge of the base. For instance, a groove may be formed adjacent to an outer edge of the base and may generally have a groove width or diameter of about 15 mm or less, such as about 12.5 mm or less, such as about 10 mm or less, such as about 7.5 mm or less, such as about 1 mm or greater, such as about 2.5 mm or greater, such as about 5 mm or greater, or any ranges or values therebetween. The groove may also be located within about 15 mm from the outer edge of the base, such as about 10 mm from the outer edge of the base, such as about 7.5 mm from the outer edge of the base, such as about 5 mm from the outer edge of the base, such as about 1 mm or more from the outer edge of the base, such as about 2.5 mm or more from the outer edge of the base, or any ranges or values therebetween.

While, various sizes and dimensions have been discussed in detail above, in one aspect, the end cover may have a height, projecting portion inner and outer diameter, base diameter, and cross section, sized and selected based upon the size of the component, and specifically, the distal end of the component that contains the electrical components. For instance, in one aspect, the inner diameter of the end cover is selected to be larger than the outer diameter of the distal end of the component, while detachably retaining the distal end of the component within the end cover. For instance, the inner diameter may be only slightly larger than the outer diameter of the distal end of the component such that the end cover does not tilt or turn once placed over the sensor.

Additionally or alternatively, while various diameters and shapes of the base have been discussed, in one aspect, the diameter and shape of the base is selected based upon a gasket that may be located between opposing faces of the end cover and the sleeve, or vice-a-versa. Namely, in one aspect, the diameter and/or shape of the base and the diameter and/or shape of a gasket may be selected to complement one another. For instance, when a circular base is used, a circular gasket may be selected. Furthermore, the diameter of the gasket may be selected to have the same or similar outer diameter as one or more of the base of the end cover and the base of the sleeve. Moreover, in an aspect where the base of the end cover includes a groove, the gasket may have a ridge that corresponds to the groove, where a width and shape of the ridge is selected to be retained in the groove of the base of the end cover in order to form a liquid-tight seal.

Therefore, in one aspect, the sealing assembly according to the present disclosure may include a sealing gasket. In one aspect, the sealing gasket may have a generally circular shape, and may have a diameter of about 35 mm or greater, such as about 40 mm or greater, such as about 45 mm or greater, such as about 50 mm or greater, such as about 70 mm or less, such as about 65 mm or less, such as about 60 mm or less, such as about 55 mm or less, or any ranges or values therebetween, and, in one aspect, may have a diameter of about 45 mm to about 55 mm.

Furthermore, in one aspect, the sealing gasket may also include a ridge located around the circumference or edge of the gasket. For instance, a ridge may be formed adjacent to an outer edge of the ridge and may generally have a width of about 15 mm or less, such as about 12.5 mm or less, such as about 10 mm or less, such as about 7.5 mm or less, such as about 1 mm or greater, such as about 2.5 mm or greater, such as about 5 mm or greater, or any ranges or values therebetween. The ridge may also be located within about 15 mm from the outer edge of the gasket, such as about 10 mm from the outer edge of the gasket, such as about 7.5 mm from the outer edge of the gasket, such as about 5 mm from the outer edge of the gasket, such as about 1 mm or more from the outer edge of the gasket, such as about 2.5 mm or more from the outer edge of the gasket, or any ranges or values therebetween.

In one aspect, unlike the base of the end cover, the gasket may have a ridge that protrudes symmetrically from both a first face and an opposed second face of the gasket. In such a manner the ridge may extend or protrude from both the first face, and opposed second face, where the ride protruding from both the first face and opposed second face have a width and spacing according to the above. Furthermore, in one aspect, the ridge is symmetrically spaced and sized on both the first face and opposed second face.

Notwithstanding the size of the gasket, in one aspect, the gasket is formed from a material that is capable of forming a liquid-tight seal between the end cover and the sleeve, and that is also stable at high temperatures and in strong chemical environments. In one aspect, the sealing gasket may be formed from a breach resistant rubber or elastomer compound. For instance, in one aspect, the sealing gasket is formed from an ethylene propylene diene terpolymer (EPDM), a silicon vinyl methyl silicon rubber (MVQ), polytetrafluoroethylene (PTFE), synthetic rubber and fluoropolymer elastomer (FKM), perfluoroelastomer compounds (FFKM), or combinations thereof. Additionally or alternatively, the gasket may also be formed of a plastic or graphite, such as polyvinylidene fluoride (PVDF), flexible graphite/nitrile rubber (Buna-N), polysulfone, or combinations thereof. Of course, in an alternative aspect, the gasket may be formed from alternative materials as are known in the art and selected based upon the temperatures and chemicals to be used during cleaning.

While the end cover and sealing gasket have thus far been discussed in detail, the sealing assembly according to the present disclosure may also include a sleeve. The sleeve may also have a base and a projecting portion, where the projecting portion of the sleeve may also extend from a first end adjacent to the base to a second end, however, both the first end of the projecting portion adjacent to the base and the second end of the projecting portion may contain openings. Furthermore, the sleeve may define a cavity extending from the opening in the first end to the opening in the second end. As discussed above, the projecting portion may have a cylindrical cross section, however, any other cross sections may be selected as noted, and may be based upon the cross section of the sensor to be covered. Moreover, in one aspect, the cavity of the sleeve and the cavity of the projecting portion may be formed to have generally the same shape and size, such that when the base of the sleeve and the base of the projecting portion are placed together, the cavities may be aligned. For instance, in such a manner, a component may be placed into both cavities simultaneously.

Nonetheless, in one aspect, the projecting portion of the sleeve may also be generally cylindrical with open first and second ends. In one aspect, the openings in the first and second ends, and thus, the cavity therebetween, may have generally the same diameter (or width), for instance, an inner diameter of about 5 mm or greater, such as about 7.5 mm or greater, such as about 10 mm or greater, such as about 12.5 mm or greater, such as about 14 mm or greater, such as about 30 mm or less, such as about 25 mm or less, such as about 22.5 mm or less, such as about 20 mm or less, such as about 17.5 mm or less, such as about 15 mm or less, or any ranges or values therebetween, and, in one aspect, may have a diameter of about 10 mm to about 20 mm. Of course, each opening may be selected to have the same diameter or a different diameter according to the above diameters. In one aspect, the openings have generally the same diameter, however, in one aspect, the projecting portion of the sleeve (or the end cover) may have a tapered cross section (e.g. conical if a generally spherical cross-section), such that the opening at the distal end has a diameter different from the opening at the proximal end.

Furthermore, the projecting portion of the sleeve may have an outer diameter of about 17.5 mm or greater, such as about 20 mm or greater, such as about 22 mm or greater, such as about 25 mm or greater, such as about 30 mm or greater, such as about 45 mm or less, such as about 40 mm or less, such as about 35 mm or less, such as about 32.5 mm or less, such as about 30 mm or less, such as about 27.5 mm or less, such as about 25 mm or less, or any ranges or values therebetween, and, in one aspect, may have an inner diameter of about 20 mm to about 30 mm.

Furthermore, regardless of the cross section and diameter selected for the sleeve, in an aspect, the base of the sleeve may generally have a diameter (or width if a non-circular cross section is used) that is about 1.5 times the diameter of the inner diameter of the projection portion, such as about 2 times the inner diameter, such as about 2.4 times the inner diameter of the projecting portion, such as about 2.7 times the inner diameter of the projecting portion, such as about 3 times the inner diameter of the projecting portion, such as about 3.5 times the inner diameter of the projecting portion. Notwithstanding the ratio of the diameters, in one aspect, the base of the sleeve may have a diameter of about 35 mm or greater, such as about 40 mm or greater, such as about 45 mm or greater, such as about 50 mm or greater, such as about 70 mm or less, such as about 65 mm or less, such as about 60 mm or less, such as about 55 mm or less, or any ranges or values therebetween, and, in one aspect, may have a diameter of about 45 mm to about 55 mm. Furthermore, in one aspect, the base of the sleeve may have a diameter that is generally the same as the diameter of the base of the end cover. Additionally or alternatively, as discussed above, the base of the sleeve may be selected to have generally the same size and shape as the sealing gasket.

Furthermore, regardless of the cross section and diameter selected for the sleeve, in one aspect, the projecting portion of the sleeve may have a length between the first end and the second end of about 1 mm or greater, such as about 2.5 mm or greater, such as about 5 mm or greater, such as about 7.5 mm or greater, such as about 10 mm or greater, such as about 12 mm or greater such as about 25 mm or less, such as about 22.5 mm or less, such as about 20 mm or less, such as about 17.5 mm or less, such as about 15 mm or less, or any ranges or values therebetween, and, in one aspect, may have a length of about 7.5 mm to about 15 mm.

Additionally or alternatively, in one aspect, the base of the sleeve may also include a groove located around the circumference or edge of the base. For instance, a groove may be formed adjacent to an outer edge of the base and may generally have a groove width or diameter of about 15 mm or less, such as about 12.5 mm or less, such as about 10 mm or less, such as about 7.5 mm or less, such as about 1 mm or greater, such as about 2.5 mm or greater, such as about 5 mm or greater, or any ranges or values therebetween. The groove may also be located within about 15 mm from the outer edge of the base, such as about 10 mm from the outer edge of the base, such as about 7.5 mm from the outer edge of the base, such as about 5 mm from the outer edge of the base, such as about 1 mm or more from the outer edge of the base, such as about 2.5 mm or more from the outer edge of the base, or any ranges or values therebetween. In one aspect, the groove of the sleeve may have the same dimensions as the groove of the end cover. In a further aspect, the groove of the sleeve and the groove of the end cover may be sized and oriented so as to accept corresponding ridges in a sealing gasket.

While, various sizes and dimensions have been discussed in detail above, in one aspect, the sleeve may have a height, inner diameter, base diameter, and cross section sized and selected based upon the size of the sensor, and specifically, a portion of the component body adjacent to the electrical components to be protected that begins the segment containing the electrical components (e.g. the portion of the sensor body adjacent to, and located before, the electrical components when moving from a proximal measuring end to a distal end containing the electrical components of the sensor). For instance, in one aspect, the inner diameter of the sleeve is selected to be larger than the outer diameter of the portion of the component body adjacent to the electrical components, so that the sleeve may be placed around the sensor body but also form a liquid-tight seal. For instance, the inner diameter of the cavity of the sleeve projecting portion may be only slightly larger than the outer diameter of the portion of the sensor adjacent to the electrical components such that the sleeve does not tilt or turn once placed over the component or sensor.

Notwithstanding the above diameters of the sleeve projecting portion, in one aspect, the sleeve is shaped and sized so as to be placed around a sensor body such that the base of the sleeve is located directly below the electrical components of a sensor. (see, e.g. FIG. 5). Therefore, in such an aspect, the end cover may extend from the distal end of the sensor to the base of the sleeve, such that the base of the end cover faces the base of the sleeve.

Additionally or alternatively, in one aspect, the interior surface of the sleeve projecting portion may have a ribbed or threaded pattern etched or otherwise patterned onto or in the surface thereof. For instance, in one aspect, the sleeve may have a ribbed design or surface pattern so as to be more securely associated with the sensor body while remaining removable. In an alternatively aspect, the inner surface may have a thread groove pattern that is complementary to a thread groove located on the body of the sensor adjacent to the electronic components. Of course, as noted above, in one aspect, the inner surface does not have any patterning or etching.

Regardless of the shape and dimensions of the end cover and sleeve selected, the end cover and the sleeve may generally be formed from a breach resistant material, such as the sealing gasket materials discussed above. However, in one aspect, the end cover and sleeve may instead be formed from a metal, or alloy thereof, that has good resistance to strong chemicals and high temperatures. For instance, in one aspect, the end cover and sleeve may be formed from stainless steel. Of course, it should be understood that, in one aspect, the end cover and sleeve may be formed from different materials.

While the sleeve, end cover, and sealing gasket have been discussed in detail above, in one aspect, the sealing assembly further includes a clamp. For instance, in one aspect, the clamp may be a single pin, double pin, high pressure, safety, lock out, 3-segment, or other process clamp as is known in the art. Regardless of the type of clamp selected, the claim is configured to contact at least the sleeve and end cover in order to facilitate a liquid-tight seal between the end cover and sleeve. Furthermore, in one aspect, the clamp may be a single pin clamp that can form a liquid-tight seal.

Regardless of the type and material selected for the clamp, in one aspect, the clamp may have an inner diameter of about 17.5 mm or greater, such as about 20 mm or greater, such as about 22 mm or greater, such as about 25 mm or greater, such as about 30 mm or greater, such as about 45 mm or less, such as about 40 mm or less, such as about 35 mm or less, such as about 32.5 mm or less, such as about 30 mm or less, such as about 27.5 mm or less, such as about 25 mm or less, or any ranges or values therebetween, and, in one aspect, may have an inner diameter of about 20 mm to about 30 mm. Generally speaking, the clamp may be selected to have a size corresponding to the outer diameter of the sleeve and/or end cover in order to facilitate a liquid-tight seal with the sealing assembly.

Notwithstanding the type of clamp selected, in one aspect, the clamp may generally be formed from a breach resistant rigid plastic. However, in one aspect, the clamp may instead be formed from a metal, or alloy thereof, that has good resistance to strong chemicals and high temperatures. For instance, in one aspect, the clamp may be formed from stainless steel. Of course, it should be understood that other materials as are known in the art may also be used to form the clamp.

While the description has so far discussed the features of the sealing assembly, in one aspect, the sealing assembly according to the present disclosure may further include a holder configured to cooperate with the end cover in order to maintain the component or sensor in a generally horizontal position for a period of time. Particularly, as may generally be known in the art, many automatic cleaning mechanisms utilize upper and lower cleaning mechanisms in order to properly clean a component. Therefore, it would be a further benefit to provide a cooperating holder to work in conjunction with the sealing assembly to maintain the sensor in a generally horizontal position for a period of time.

Thus, in one aspect, the present disclosure further includes a holder having a holder main body with one or more apertures therein. The holder main body may have a generally rectangular shape, where two first opposed side walls have a length longer than two second opposed side walls. For instance, the two first opposed side walls may have a length of about 100 mm to about 600 mm, such as about 150 mm to about 550 mm, such as about 200 mm to about 500 mm, such as about 250 mm to about 450 mm, such as about 300 mm to about 400 mm, or any ranges or values therebetween. Of course, it should be understood that the length of the two first opposed side walls may be increased or decreased in size based upon the number of sensors that are desired to be supported.

Furthermore, in one aspect, the second opposed side walls may have a height of about 25 mm to about 200 mm, such as about 50 mm to about 175 mm, such as about 50 mm to about 150 mm, such as about 75 mm to about 125 mm, or any ranges or values therebetween. Of course, as discussed above, it should also be understood that if a greater number of sensors, or larger or smaller sensors are used, the length of the second opposed side walls may be increased or decreased accordingly.

Moreover, in an aspect, the holder main body may have a thickness of about 5 mm to about 25 mm, such as about 7.5 mm to about 22.5 mm, such as about 10 mm to about 20 mm, such as about 12.5 mm to about 17.5 mm, or any ranges or values therebetween. However, while the holder main body and one or more arms may have the same thickness, in one aspect, the holder main body and the one or more arms may have a different thickness while each thickness may be according to the above. Furthermore, in one aspect, the holder main body have a foot having a width about 1.1 times the width of the holder main body, such as about 1.2 times the width, such as about 1.4 times the width, such as about 1.6 times the width, such as about 1.8 times the width such as about 2 times the width of the holder main body. Thus, in one aspect, the foot of the holder main body may have a width of about 15 mm to about 45 mm, such as about 20 mm to about 40 mm, such as about 25 mm to about 35 mm, or any ranges or values therebetween.

Additionally or alternatively, the holder may also include a rear main body having a size, shape and components according to the above discussion of the holder main body. In such an aspect, the rear main body may be connected to the holder main body by one or more arms, which will be discussed in greater detail below. Thus, in such an aspect, the holder may have a generally quadrilateral shape with a holder main body opposite a rear main body, forming a first and second side of the holder, and at least one arm opposite an optional second arm, forming opposed third and fourth sides of the holder. Of course, in one aspect, as discussed above, the rear main body may be optional.

Notwithstanding the sizing of the sidewalls, the holder may also include at least one aperture, such as at least two apertures, such as at least three apertures, such as at least four apertures, such as at least five apertures, such as ten apertures or less, such as nine apertures or less, such as eight apertures or less, such as seven apertures or less, such as six apertures or less, such as five apertures or less, such as four apertures or less. In one aspect, the holder has from two to four apertures.

Regardless of the number of apertures, in one aspect, the at least one aperture may have a diameter generally equal to the outer diameter of the projecting portion of the end cover. In such a manner, the projecting portion of the end cover may be placed into the aperture of the holder, and extend therethrough, in order to maintain the projecting portion of the end cover in the aperture. Therefore, in one aspect, the at least one aperture may have a diameter of about 17.5 mm or greater, such as about 20 mm or greater, such as about 22 mm or greater, such as about 25 mm or greater, such as about 30 mm or greater, such as about 45 mm or less, such as about 40 mm or less, such as about 35 mm or less, such as about 32.5 mm or less, such as about 30 mm or less, such as about 27.5 mm or less, or any ranges or values therebetween, and, in one aspect, may have an outer diameter of about 20 mm to about 30 mm.

Furthermore, when two or more apertures are used, the apertures may have a center-to-center spacing of about 60 mm to about 300 mm, such as about 75 mm to about 250 mm, such as about 85 mm to about 200 mm, such as about 100 mm to about 150 mm, or any ranges or values therebetween.

In one aspect, the apertures may be unenclosed and may simply be formed by a cut-out in the holder main body or the rear main body having a cross section corresponding to the cross section of the end cover. In such an aspect, the thickness of the holder main body or rear main body and the diameter of the aperture may be selected to support the end cover in the aperture. However, in a further aspect, the aperture may be enclosed and may include a proximal end formed in one or more of the holder main body and the rear main body, and may extend to a distal end, forming a cavity therebetween having a length at least long enough to accept the projecting portion of the end cover. In one such aspect, the distal end may be adjacent to the opposite of the holder main body and rear main body from which the proximal end is located.

Additionally or alternatively, in one aspect, when two or more apertures are used, the proximal end of the one or more apertures may be formed in the holder main body and the proximal end of the one or more apertures may be formed in the rear main body. Thus, in such an aspect, a first end cover placed into an aperture having a proximal end in a holder main body may extend in an opposite direction from an end cover placed into an aperture having a proximal end in the rear main body. Of course, in a further aspect, all of the apertures may extend in generally the same direction.

In one aspect, the holder may have one or more arms that extend from one or both of the ends of the first opposing side walls of the holder main body and/or the rear main body, and, in one aspect, the one or more arms may be two arms extending from opposite ends of the first opposing side walls of the holder main body and/or the rear main body. Particularly, the one or more arms may extend in a generally perpendicular direction from the holder main body and/or the rear main body, such as at an angle of about 45° to about 135°, such as about 55° to about 125°, such as about 65° to about 115°, such as about 75° to about 105° such as about 80° to about 100°, or any ranges or values therebetween.

The one or more arms may generally have a length of about of about 25 mm to about 200 mm, such as about 50 mm to about 175 mm, such as about 50 mm to about 150 mm, such as about 75 mm to about 125 mm, or any ranges or values therebetween. Furthermore, in one aspect, the one or more arms may have a length selected to be about the length of the projecting portion of the end cover or greater in order to provide adequate stabilization of the sensors, and, as discussed above, in one aspect may connect a holder main body to a rear main body.

Nonetheless, the one or more arms may have a height of about 25 mm to about 200 mm, such as about 50 mm to about 175 mm, such as about 50 mm to about 150 mm, such as about 75 mm to about 125 mm, or any ranges or values therebetween, and, in one aspect, may have a height that is generally the same as the length/height as the second opposed walls of the holder main body.

Furthermore in one aspect, the one or more arms may have a width generally the same as the width of the of the holder main body, such as one of the ranges discussed above. Similarly, in one aspect, the one or more arms, the holder main body, and/or the rear main body, may each have a foot such that the total width of the arm, the holder main body, or the rear main body, and the foot has a width about 1.1 times the width of the arm the holder main body, or the rear main body, such as about 1.2 times the width, such as about 1.4 times the width, such as about 1.6 times the width, such as about 1.8 times the width such as about 2 times the width of the arm, the holder main body, or the rear main body. Thus, in one aspect, the one or more arms, the holder main body, or the rear main body, may each have a foot having a width of about 15 mm to about 45 mm, such as about 20 mm to about 40 mm, such as about 25 mm to about 35 mm, or any ranges or values therebetween. Moreover, in one aspect, the one or more feet may extend for the entire length of the one or more arms, the holder main body, or the rear main body, or alternatively, may only form a projection at an intersection of an arm and the holder main body and/or rear main body.

Additionally or alternatively, in one aspect, one or more of the feet may have a shape so as to be releasably interlockable with one or more feet of a second holder. In such an aspect, the holder may stackable, such that a second holder is releasably secured above a first holder. Thus, in such an aspect, the holder may have one or more feet that extend in a downward direction at an intersection of an arm and the holder main body and/or rear main body, and may also have one or more feet that extend in an upward direction at an intersection of an arm and the holder main body and/or rear main body. In a further aspect, the one or more feet may have a reciprocal shape, such that the one or more feet of a first holder may be interchangeable with any of the one or more feet of a second holder.

For instance, as will be discussed in greater detail below in regards to FIGS. 8A and 8B, in one aspect, the feet may have a width, where both a projecting portion and a recessed portion are both contained within the width of the foot. In such an aspect, the recessed portion and the projecting portion are contained at an end of the foot distal from the holder main body, rear main body, or one or more arms. Thus, in such a manner, the recessed portion of a foot on a first holder may accept a projecting portion of a foot on a second holder, and vice-a-versa.

While various aspects have been discussed thus far, the present disclosure may be further understood based upon the following discussion of the figures.

For instance, as shown in FIG. 1, a sealing assembly 100 according to the present disclosure may generally include a sealing clamp 102, an end cover 104 and a sleeve 106. As discussed above, the end cover 104 includes a second fully enclosed end 108 located on the projecting portion 110 distal from the base 112 of the end cover 104 (shown more clearly in FIGS. 2A and 2B). Furthermore, the sleeve 106 includes a projecting portion 114 with an open distal end 116 such that the sleeve 106 may accommodate a sensor 118 through the cavity 120 (shown more clearly in FIGS. 2A and 2B).

Figure 2A:
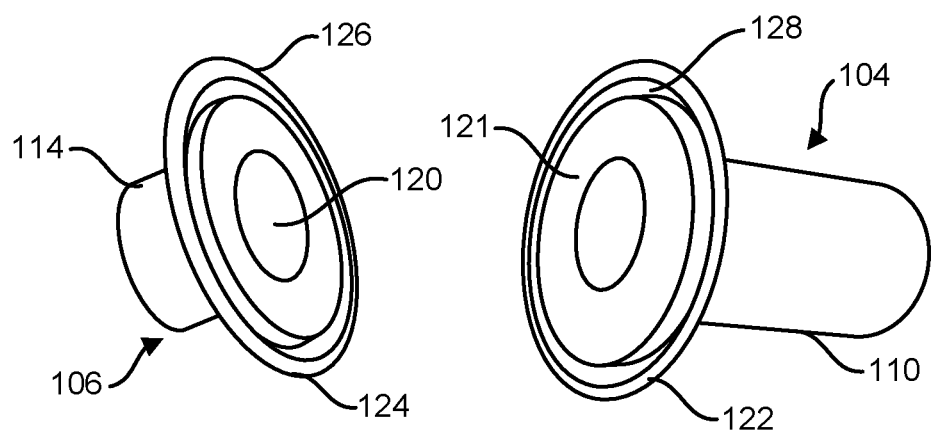
FIG. 2A is a top view of a sleeve and end cover according to an aspect of the present disclosure.
Figure 2B:
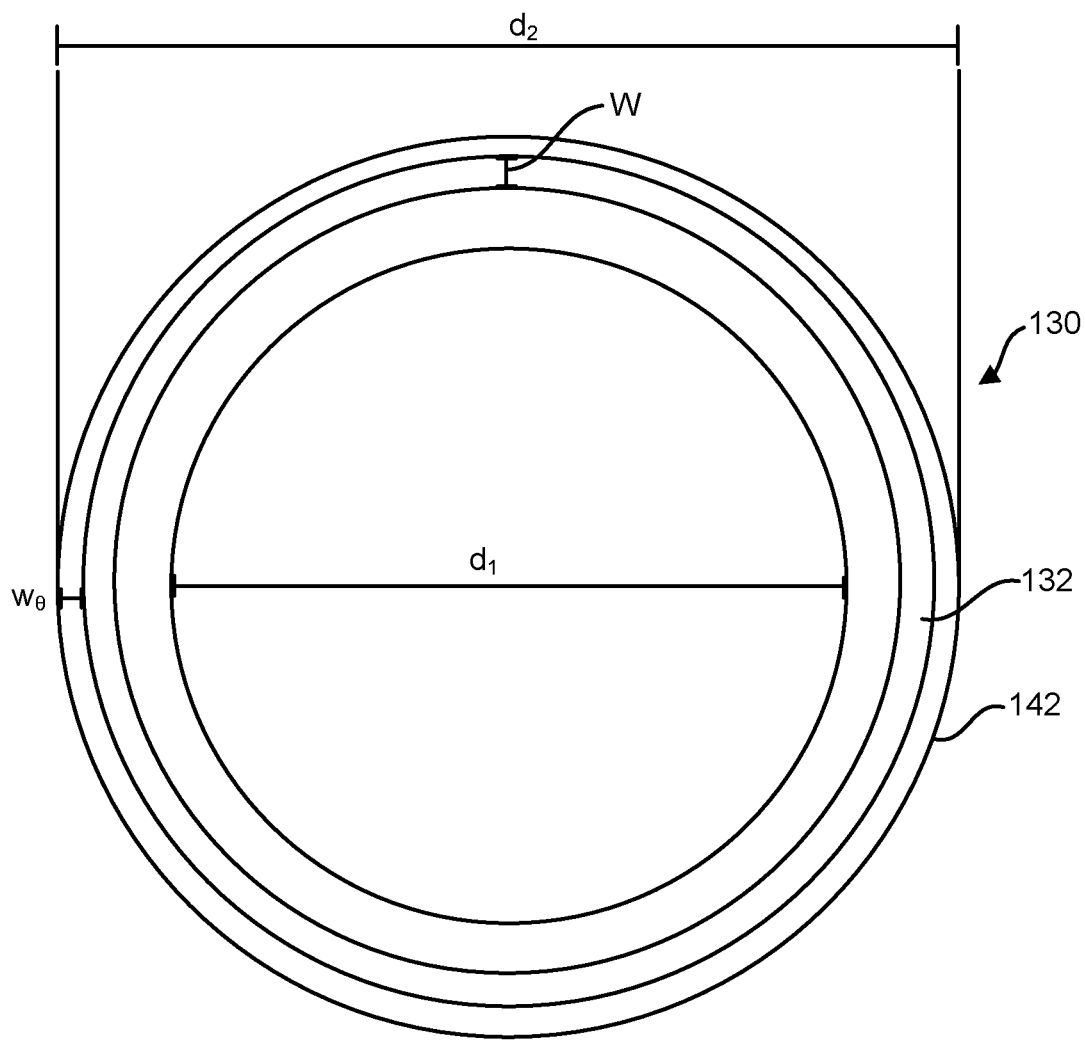
FIG. 2B is a top view of a sealing gasket according to an aspect of the present disclosure.

Particularly, as shown in FIG. 2A, the end cover 104 has a base 122 and a projecting portion 110, and the sleeve 106 has a projecting portion 114 and a base 124. Furthermore, as shown in FIG. 2, the base 124 of the sleeve 106 includes a groove 126, and the base 122 of the end cover 104 include a groove 128. As discussed above and shown in FIG. 2, in one aspect, the groove 126 of the sleeve 106 and the groove 128 of the end cover 104 may have generally the same size and shape so as to cooperate to form a liquid-tight seal with a gasket 130, shown in FIG. 2B. Furthermore, as generally shown in FIG. 2A and otherwise, the cavity 120 of the sleeve 106 may have generally the same shape and size as the cavity 121 of the end cover 104, such that the cavities 120, 121 may be aligned. In such a manner, a sensor 118, may be placed through the cavity 120 of the sleeve 106 and into the cavity 121 of the body cover 104, simultaneously.

For instance, as discussed above, in one aspect, a sealing gasket 130 may include a ridge 132 shaped and sized to cooperate with the grooves 126, 128, of the sleeve 106 and end cover 104, so as to form a liquid tight seal when clamped. Thus, in one aspect, the ridge 132 may have a width w that corresponds to a diameter or width of the grooves 126, 128, and may be located a width w2 from the outer edge 142 of the gasket. Thus, as shown in FIG. 2B, in one aspect, the ridge 142 may be located around the gasket 130 in a circumferential direction, and may be located a consistent width $w_2$ from the outer edge 142.

Figure 3A:
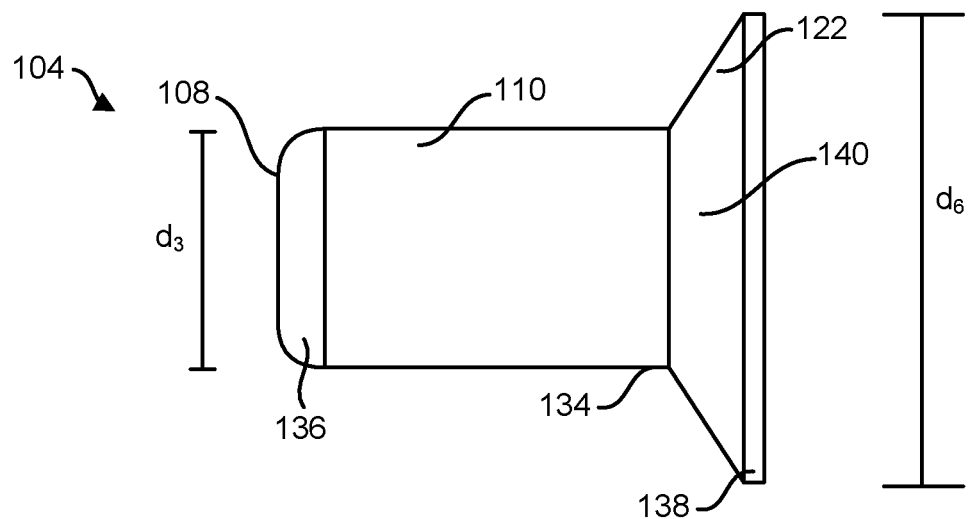
FIG. 3A is a side view of an end cover according to an aspect of the present disclosure.
Figure 3B:
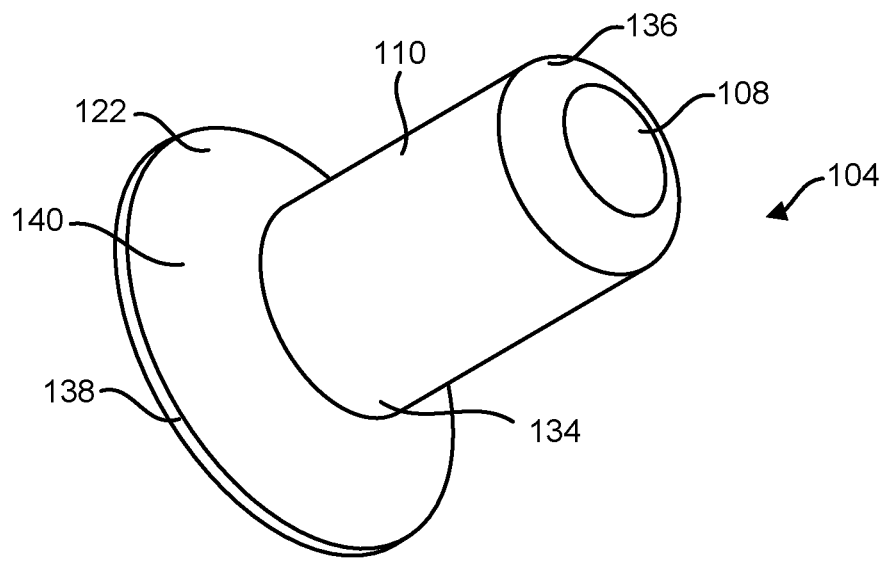
FIG. 3B is a top perspective view of the end cover of FIG. 3A.
Figure 3C:
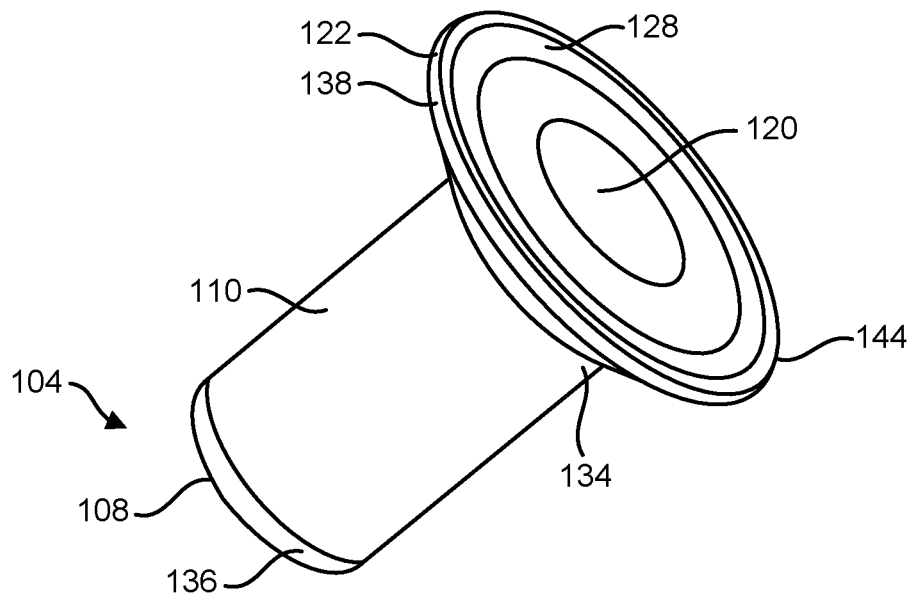
FIG. 3C is a bottom perspective view of the end cover of FIG. 3A.
Figure 3D:
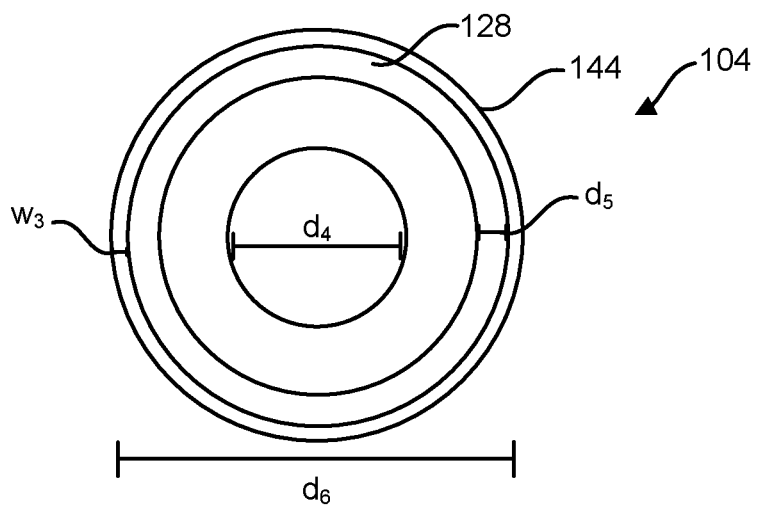
FIG. 3D is a bottom view of the end cover of FIG. 3A.
Figure 4A:
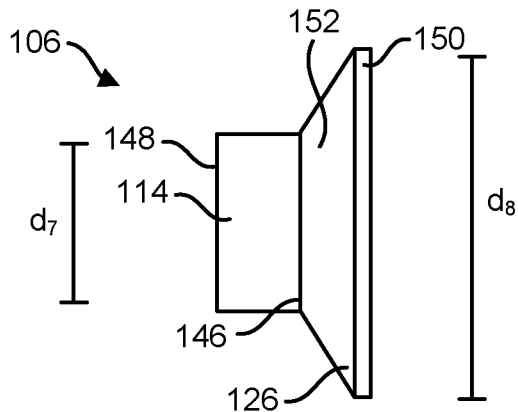
FIG. 4A is a side view of a sleeve according to an aspect of the present disclosure.
Figure 4B:
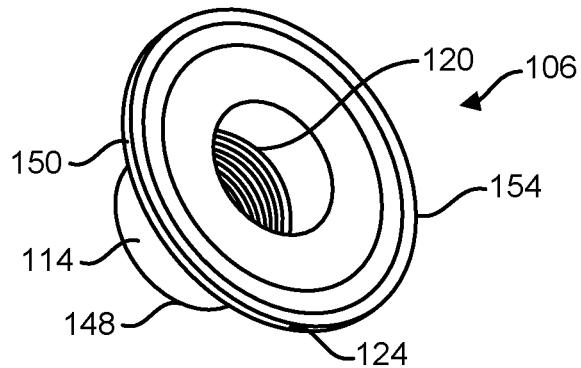
FIG. 4B is a bottom perspective view of the sleeve of FIG. 4A.
Figure 4C:
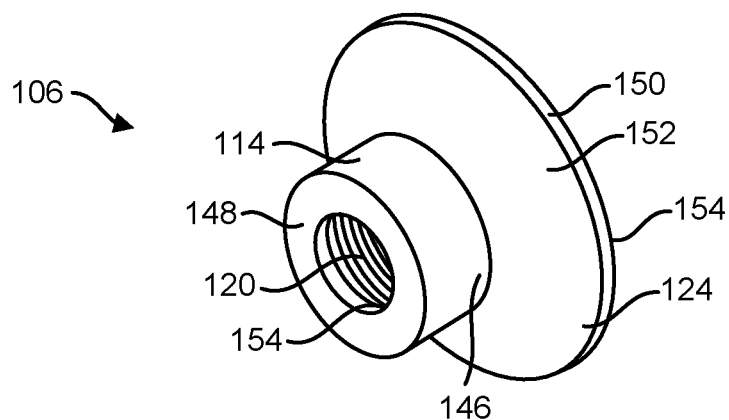
FIG. 4C is a top perspective view of the sleeve of FIG. 4A.
Figure 4D:
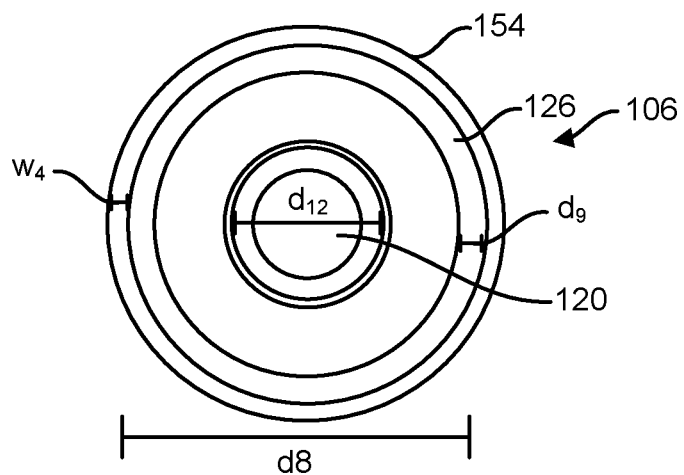
FIG. 4D is a bottom view of the sleeve of FIG. 4A.

As discussed above, the sealing gasket 130 may have an inner diameter $d_1$, that is generally the same as the inner diameter of the sleeve and/or end cover, which will be shown and discussed in greater detail in FIGS. 3D and 4D. Furthermore, the sealing gasket 130 may have an outer diameter $d_2$, that is generally the same as the outer diameter of the sleeve and/or end cover, which will be shown and discussed in greater detail in FIGS. 3D and 4D.

Nonetheless, the end cover 104 will now be discussed in greater detail in FIGS. 3A-3E. For instance, as shown in FIGS. 3A and 3B, an end cover 104 has a base 122 and a projecting portion 110. The projecting portion has a first end 134 and a fully enclosed second end 108, and an outer diameter $d_3$. Furthermore, in one aspect, the second end 108 may have a tapered portion 136 that transitions the projecting portion 110 to the second end 108. Additionally, as shown in FIGS. 3A and 3B, the base 122 has an outer diameter $d_6$, and in one aspect, the base 122 has a lip 138 that may be generally parallel to the projecting portion 110, that, while not necessary, may provide a further improved sealing surface. Nonetheless, in one aspect, when the base 122 includes a lip 138, the base may have an angled portion 140 that may be generally flat, or alternatively, convex, and which may transition the base from the first end 134 of the projecting portion 110 to the lip 122.

Furthermore, referring to FIGS. 3C and 3D, which show a bottom perspective view and a bottom view of the end cover 104 respectively, in one aspect the base 122 of the end cover 104 includes a groove 128 located around the base 122 in a generally circumferential direction. As generally shown in FIG. 3D, the groove 128 may have a diameter $d_5$, which may generally correspond with the width w of the ridge 132 of the gasket 130, and may be located a distance $w_3$ from the outer edge 144 of the base 122, which may be generally equal to the distance $w_2$ that the corresponding ridge 132 of the gasket 130 is located from the outer edge 142 of the gasket 130. Additionally, as discussed above, the base 122 may have an outer diameter $d_6$, which, in one aspect, may be generally the same as the outer diameter $d_2$ of the gasket 130. Moreover, as the projecting portion 110 has a fully enclosed second end 108, FIG. 3D provides the clearest view of the interior diameter $d_4$ of the projecting portion 110.

Figure 3E:
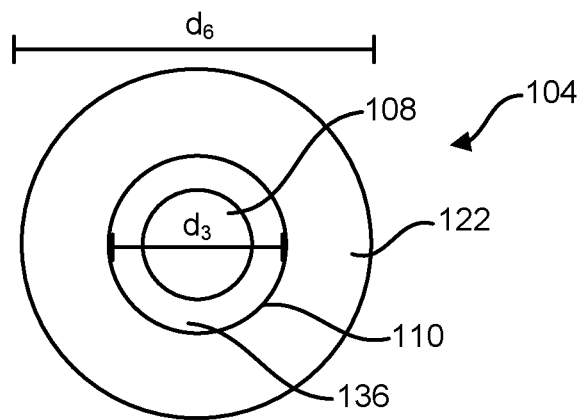
FIG. 3E is a top view of the end cover of FIG. 3A.

Finally, FIG. 3E shows a top view of the end cover 104. Particularly, the end cover 104 has a base 122 with an outer diameter d6, and a projecting portion 110 with an outer diameter d3. Furthermore, as previously discussed, in one aspect, the fully enclosed second end 108 may have a tapered portion 136.

While the end cover 104 has so far been discussed in detail, the sleeve 106 will now be described in further detail in regards to FIGS. 4A-4E. For instance, as shown in FIGS. 4A and 4B, a sleeve 106 has a base 124 and a projecting portion 114. The projecting portion 114 has a first end 146 and a second end 148, and an outer diameter $d_7$. As discussed above, the sleeve 114 also includes a cavity 120 extending from the first end to the second end and having a diameter $d_{12}$ (shown more clearly in FIG. 4D) that may generally correspond to the inner diameter $d_4$ of the projecting portion 110 of the end cover 104 and/or the outer diameter of a component or sensor 118 to be used with the sealing assembly 100 according to the present disclosure. Moreover, as discussed above, in one aspect, the cavity 120 may include threads or thread grooves, generally shown by reference character 154.

Additionally, as shown in FIGS. 4A-4C, the base 124 has an outer diameter $d_8$, and in one aspect, the base 124 has a lip 150 that may be generally parallel to the projecting portion 114, that, while not necessary, may provide a further improved sealing surface. Nonetheless, in one aspect, when the base 124 includes a lip 150, the base 124 may have an angled portion 152 that may be generally flat, or alternatively, convex, and which may transition the base 124 from the first end 146 of the projecting portion 114 to the lip 150.

Furthermore, referring to FIGS. 4B and 4D, which show a bottom perspective view and a bottom view of the sleeve 106 respectively, in one aspect the base 124 of the sleeve 106 includes a groove 126 located around the base 124 in a generally circumferential direction. As generally shown in FIG. 4D, the groove 126 may have a diameter $d_9$, which may generally correspond with the width w of the ridge 132 of the gasket 130 and/or the diameter $d_5$ of the ridge 128 of the end cover 104, and may be located a distance $w_4$ from the outer edge 156 of the base 124, which may be generally equal to the distance $w_2$ that the corresponding ridge 132 of the gasket 130 is located from the outer edge 142 of the gasket 130 or the distance $w_3$ that the corresponding groove 128 of the end cover 104 is located from its respective outer edge 144. Additionally, as discussed above, the base 124 may have an outer diameter $d_8$, which, in one aspect, may be generally the same as the outer diameter $d_2$ of the gasket 130 or the outer diameter $d_6$ of the base 122 of the end cover 104.

Figure 4E:
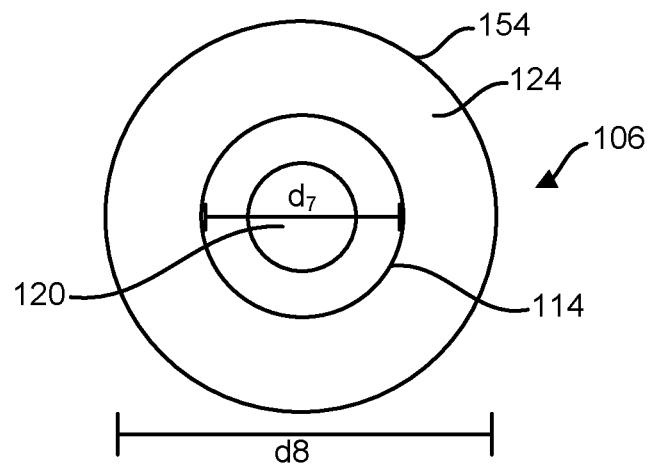
FIG. 4E is a top view of the sleeve of FIG. 4A.

Finally, FIG. 4E shows a top view of the sleeve 106. Particularly, the sleeve 106 has a base 124 with an outer diameter $d_8$, and a projecting portion 114 with an outer diameter $d_7$. Furthermore, as previously discussed, the opening 120 extends through the sleeve 106 such that a sensor or the like may be placed within or through the opening.

Figure 5:
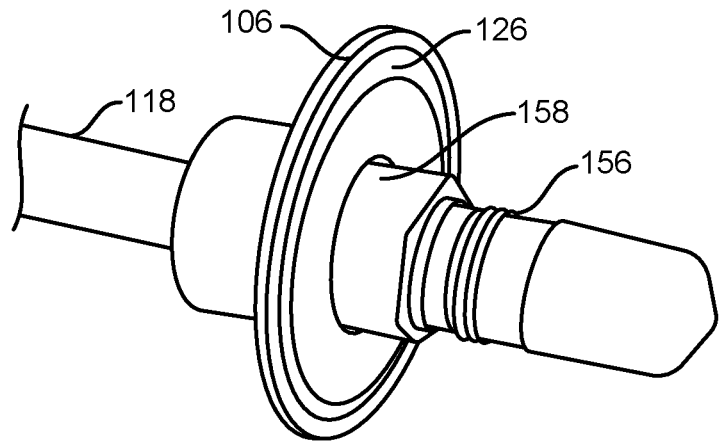
FIG. 5 is a side view of a sleeve located on a component according to the present disclosure.

For instance, referring to FIG. 5, a portion of a sealing assembly is shown around a portion of a sensor 118 adjacent to the electrical components 156. Particularly, as discussed above, the sleeve 106 is placed around the sensor 118 and is brought to rest at the distal end of the sensor 158 adjacent to the electrical components 156. The groove 126 of the base 106 of the sleeve 106 is facing the electrical components 156 such that the corresponding groove 128 of the end portion 105 and/or the ridge 132 of the gasket 130 may contact the groove 126 of the sleeve 106 when placed over the electrical components 156.

Figure 6A:
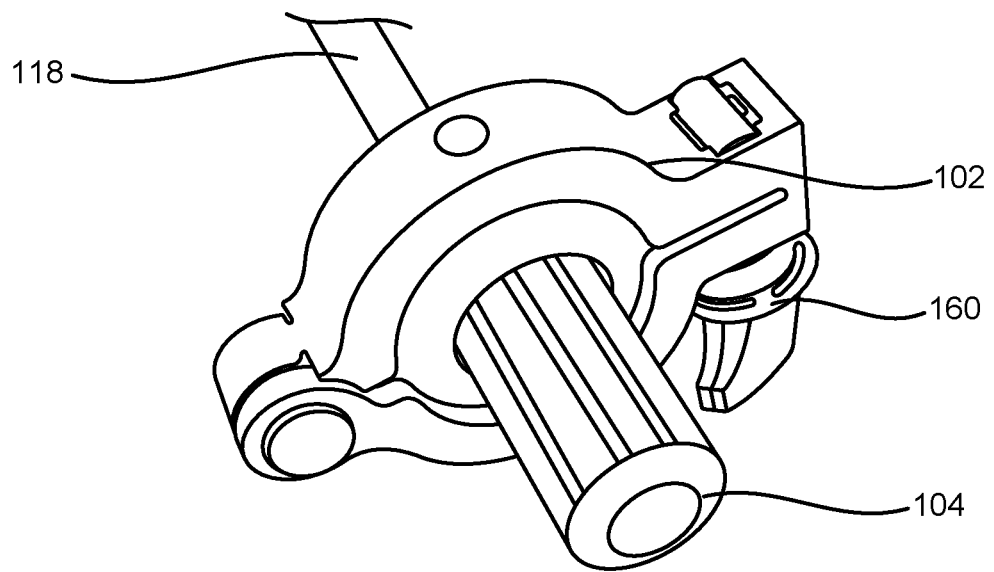
FIG. 6A is a top perspective view of a clamp according to the present disclosure.
Figure 6B:
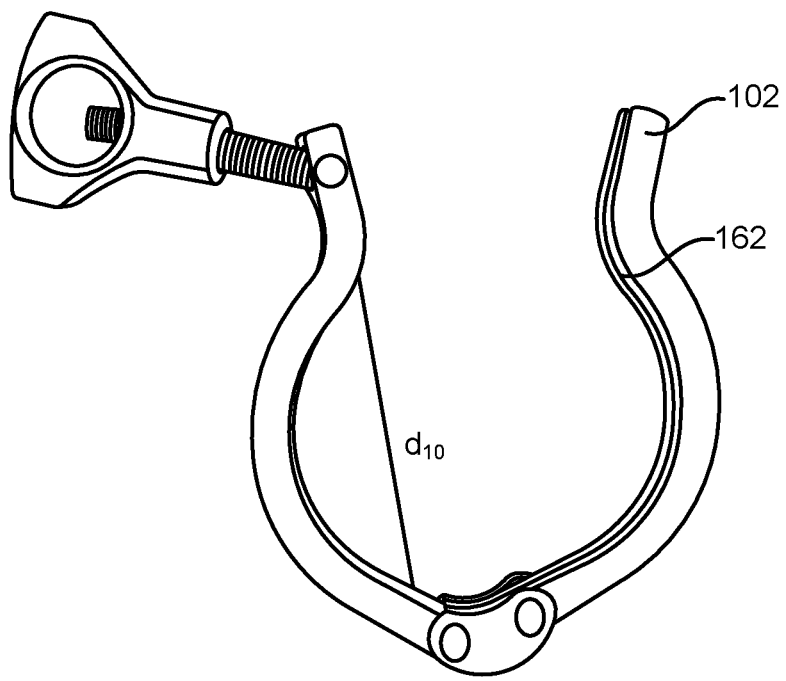
FIG. 6B is a side view of a clamp according to an aspect the present disclosure.
Figure 6C:
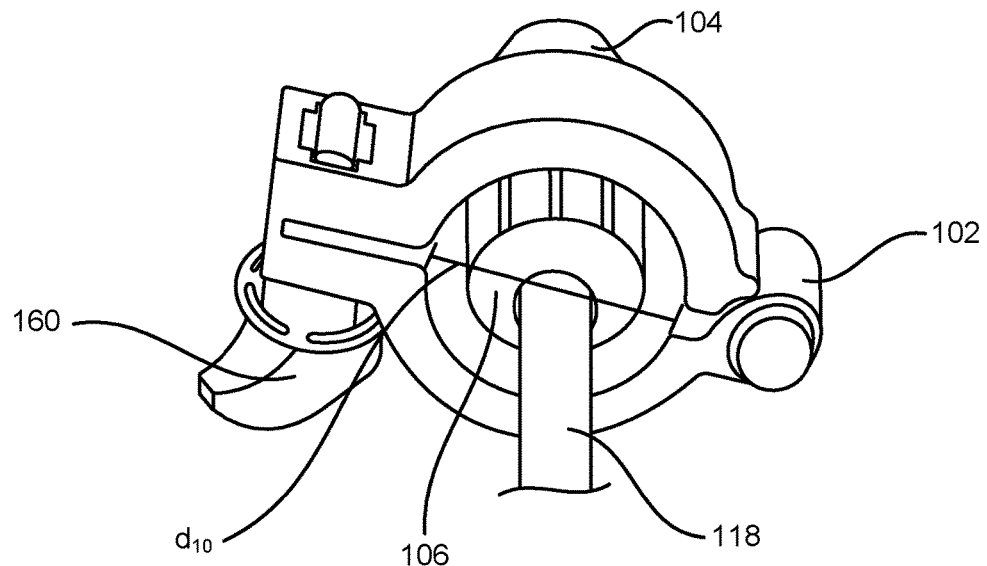
FIG. 6C is a bottom perspective view of a clamp according to an aspect of the present disclosure.
Figure 7A:
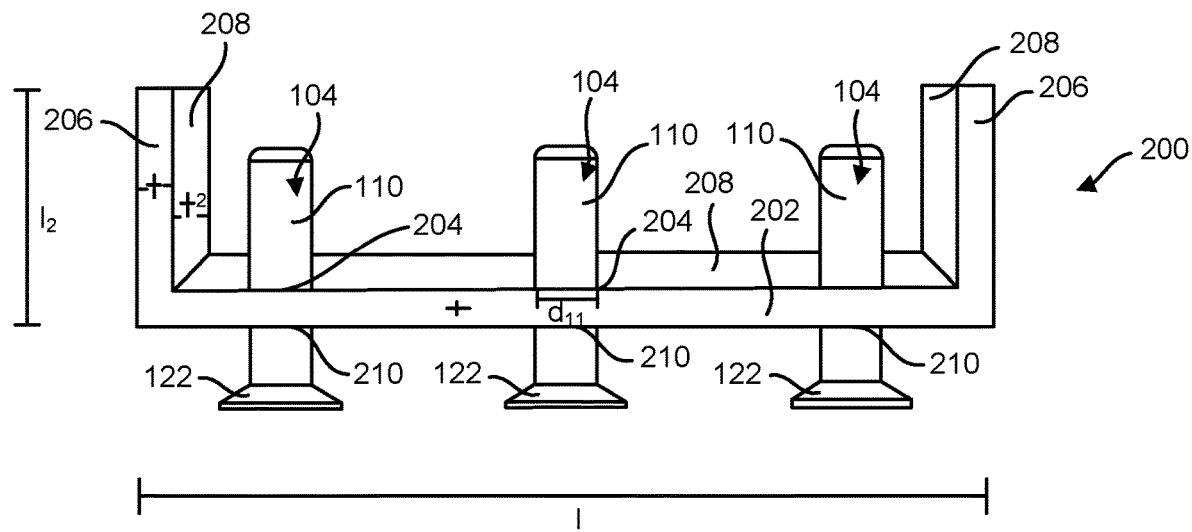
FIG. 7A is a top view of a holder according to one aspect of the present disclosure.
Figure 7B:
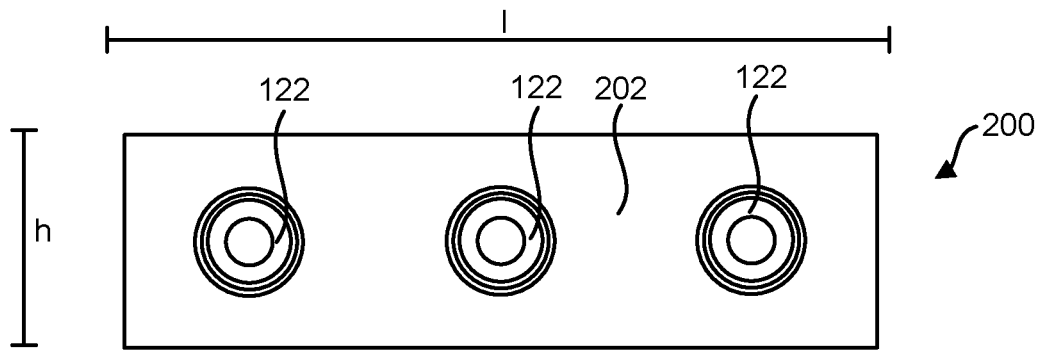
FIG. 7B is a front view of a holder according to FIG. 7A.
Figure 7C:
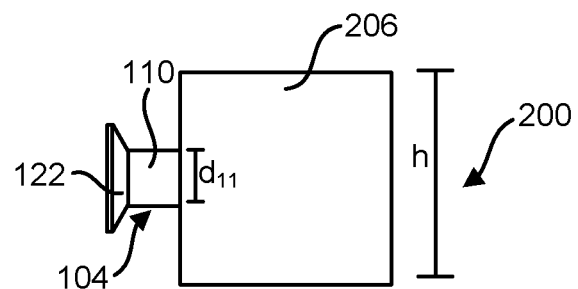
FIG. 7C is a side view of a holder according to FIG. 7A.
Figure 7D:
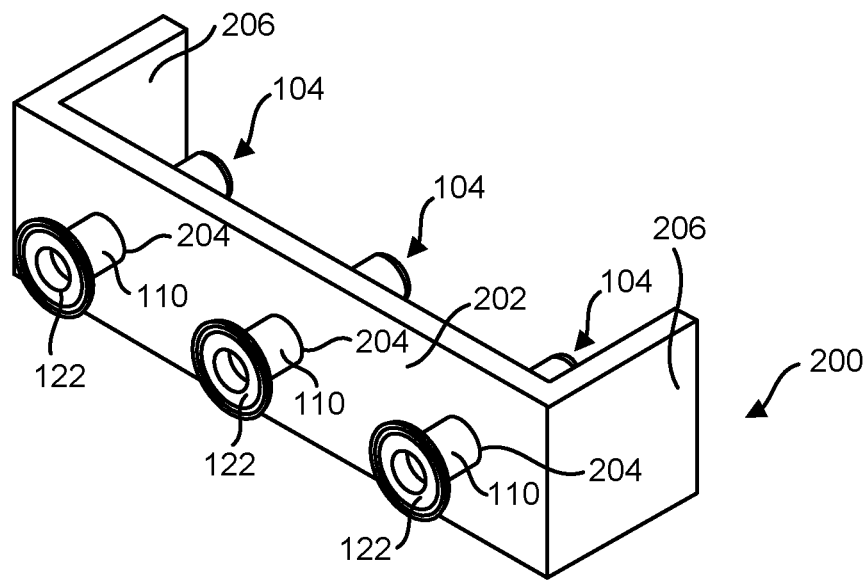
FIG. 7D is a side perspective view of a holder according to FIG. 7A.
Figure 7E:
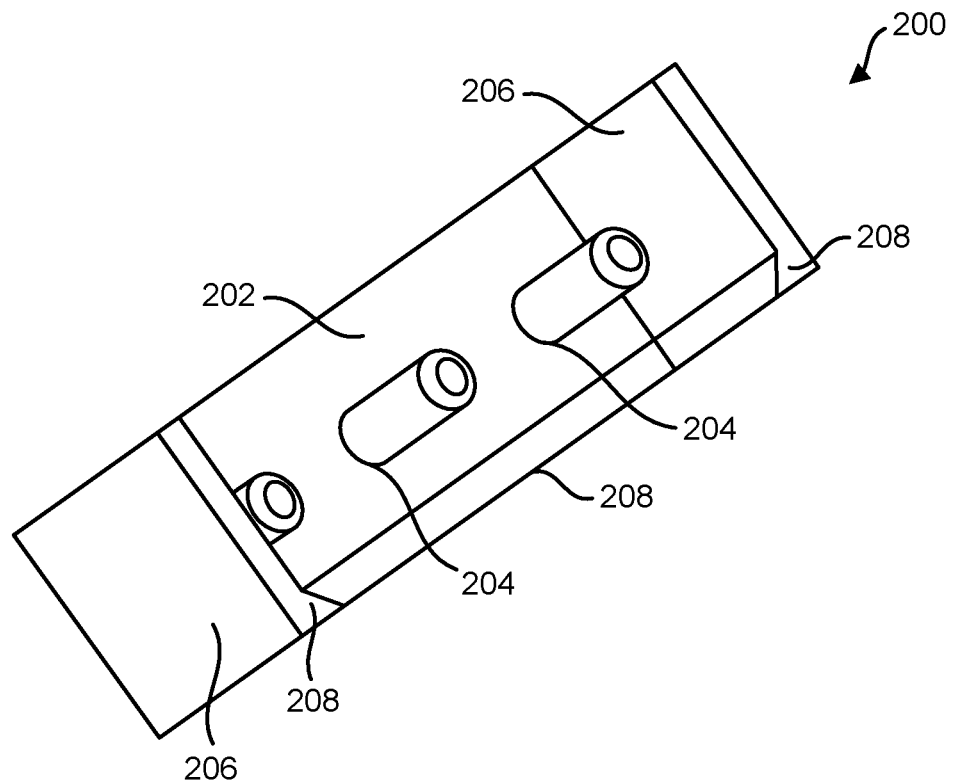
FIG. 7E is a rear perspective view of a holder according to FIG. 7A.

Next, referring to FIGS. 6A-6C, a clamp 102 according to the present disclosure will be discussed in greater detail. For instance, in the present aspect, a two-section clamp is shown that has a hand-tightened closure 160. For instance, in this aspect, the two-section clamp may be tightened by turning the closure 160 until hand-tight, yielding a liquid-tight seal between the sleeve 106, end cover 104, and sealing gasket 130. Of course, as discussed above, various types of clamps and closures may be used. Additionally, in one aspect, the clamp 102 may have an inner diameter $d_{10}$ which may be generally equal to the outer diameter $d_7$ of the sleeve 106 projecting portion 114 and/or the outer diameter $d_3$ of the end cover 104 projecting portion 110. Furthermore, as shown in FIG. 6B, the clamp 102 may also include a recess 162 shaped and sized to accommodate the sleeve 106, end cover 104, and sealing gasket 130 in the recess.

Finally, while one or more aspects of the sealing assembly 100 have been discussed in great detail above, in a further aspect, a holder 200 may be used to maintain a sensor 118 and cleaning assembly 100 in a generally horizontal position for a period of time. For instance, referring to FIGS. 7A-7E the holder 200 may include a holder main body 202 having a length l and a height h with one or more apertures 204 therein (shown with the end cover 104 inserted in the proximal end 210 of the aperture 204 for reference). The holder 200 may also include one or more arms 206 having a length l2 that extend in a generally perpendicular direction from the holder main body 202. As shown, the holder main body 202 and the one or more arms 206 may each have a thickness t. Furthermore, as discussed above, in one aspect, the one or more arms 206 and the holder main body 202 may each have a foot 208 that extends from the bottom (surface contacting) side of the one or more arms 206 and/or the holder main body 202. For instance, as shown, when used, the foot or feet may have a thickness $t_2$ that approximately doubles the thickness t of the arm 206 or holder main body 202 and extend for the entire length l of the holder main body. Regardless, the holder 200 may be able to maintain the sealing assembly and the sensor in a position generally perpendicular to the holder main body 202 and parallel to the surface on which the holder 202 is resting.

Figure 8A:
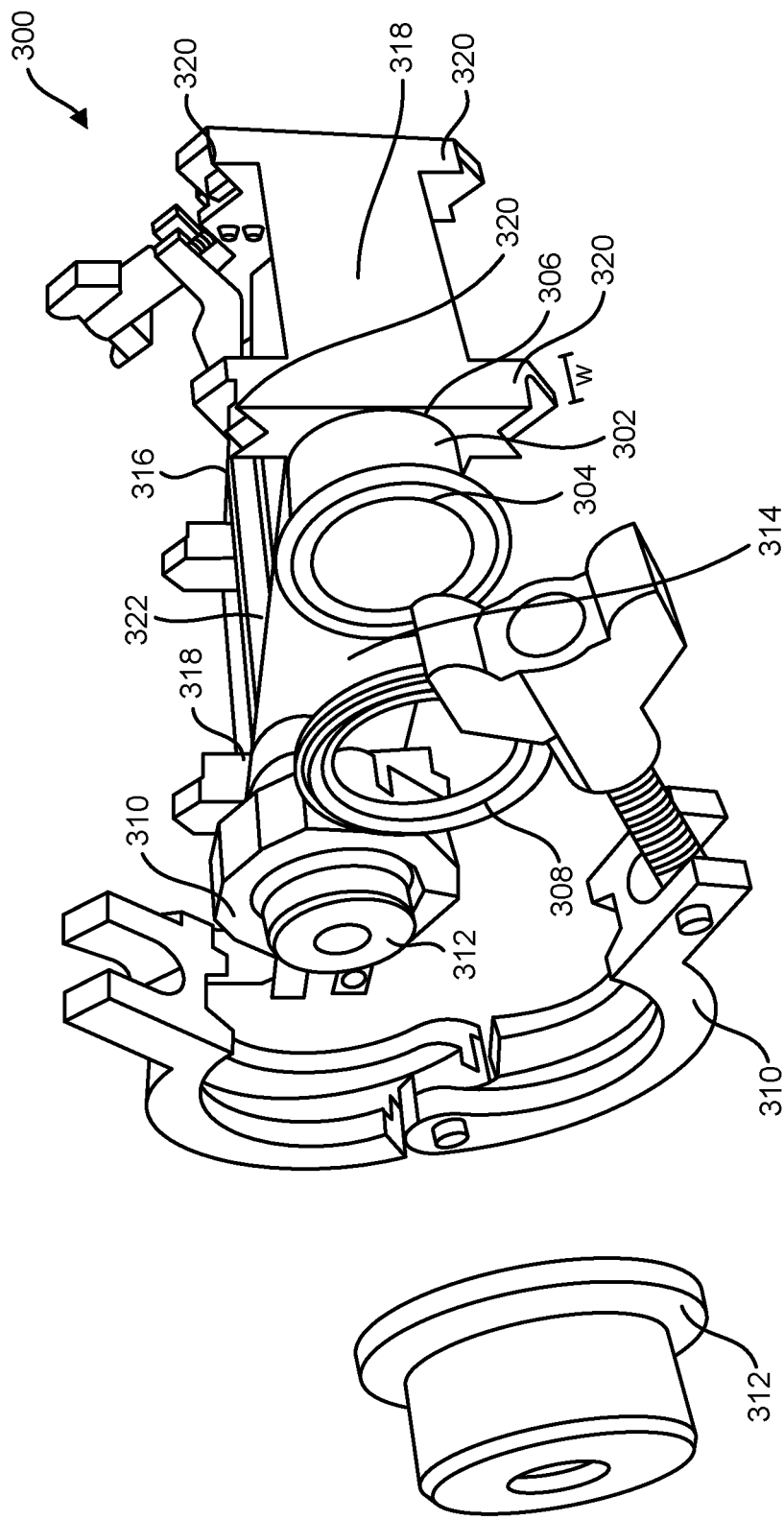
FIG. 8A is a front perspective view of a holder according to one aspect of the present disclosure where a sealing assembly is shown in a breakout view.
Figure 8B:
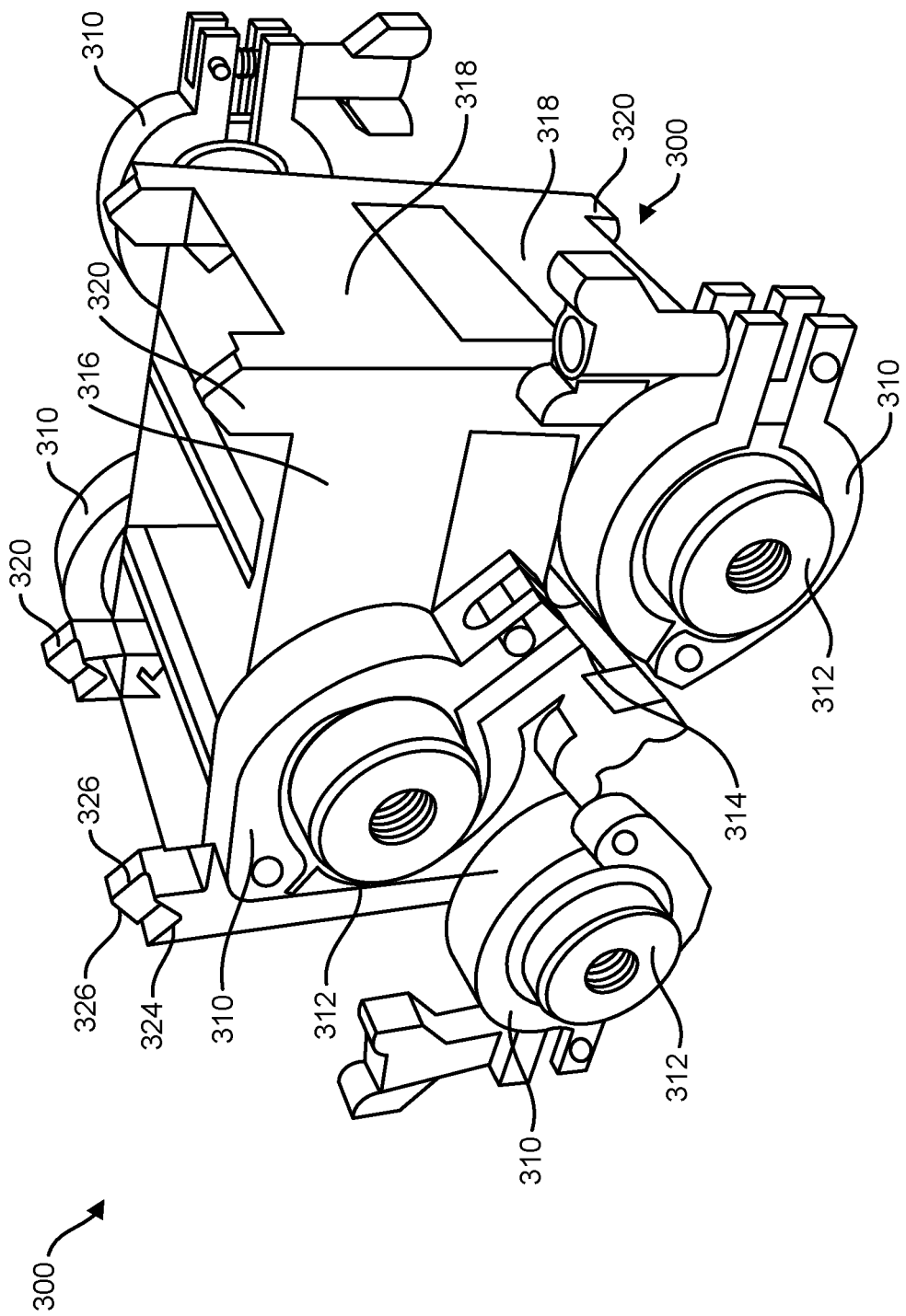
FIG. 8B is a perspective view of a holder according to one aspect of the present disclosure.

Next referring to FIGS. 8A and 8B, as discussed above, in one aspect, the holder 300 may have one or more apertures 302 configured to accept an end cover 304 (shown with the end cover 304 inserted into the proximal end 306 of the aperture 302. Furthermore, as shown in the breakout, a sealing gasket 308, sealing clamp 310, and sleeve 312 may all cooperate together to form a sealing assembly. As shown in FIGS. 8A and 8B, in one aspect, the apertures 302 may be enclosed. In such an aspect, the proximal end 306 may be open and a distal end 322 may be enclosed, where a cavity (not shown) extends from the proximal end 306 to the distal end 322. Furthermore, as shown in FIGS. 8A and 8B, in one aspect, the proximal end 306 of one aperture 302 may be formed in the holder main body 314 and a second aperture 302 may have its proximal end 306 formed in the rear main body 316, such that the apertures extend in opposite directions.

Nonetheless, as shown in FIGS. 8A and 8B, the holder 300 may have a holder main body 314, a rear main body 316, and one or more arms 318. Additionally, as shown in FIGS. 8A and 8B, the feet 320 may form projections extending from an intersection of the holder main body 314 and one or more arms 318 or the rear main body 316 and one or more arms 318. As discussed above, in one aspect, the foot or feet 320 may have a width w, where a recessed portion 324 and a projecting portion 326 are formed in the width w. In such as manner, as shown in FIG. 8B, two or more holders 300 may be stacked by interlocking the projecting 326 and recessed 324 portions of the feet 320. For instance, in one such aspect, the rear main body 316 of a second holder 300 may be disposed above the holder main body 314 of a first holder 300, such that the projecting 326 and recessed 324 portions of the feet may interlock to releasably hold the second holder 300 in position above the first holder 300. As shown in FIG. 8B, in such an aspect 6 components (three per holder) may be held in a horizontal position during a cleaning cycle.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A sealing assembly for providing a liquid-tight seal around a component during a cleaning process, comprising:
   an end cover having a first end and a second end, wherein the first end comprises an opening and the second end is fully enclosed, and a cavity extends from the opening towards the second end;
   a sleeve having a first end and a second end, wherein the sleeve comprises an opening in the first end and an opening in the second end, and defines a cavity therebetween;
   a sealing gasket;
   a sealing clamp; and
   a holder,
   wherein the cavity in the end cover and the cavity defined by the sleeve are aligned and configured to accept a component therein.

2. The sealing assembly of claim 1, wherein the end cover, the sleeve, or both the end cover and the sleeve further comprise a base having a groove that extends circumferentially around the base of the respective sleeve or end cover.

3. The sealing assembly of claim 2, wherein the end cover, the sleeve, or both the end cover and the sleeve further comprise a projecting portion that extends from the base to the second end of the respective sleeve or end cover.

4. The sealing assembly of claim 1, wherein the gasket includes a ridge that extends circumferentially around the gasket.

5. The sealing assembly of claim 4, wherein the ridge is seated in the groove of the end cover, the sleeve, or both the end cover and the sleeve.

6. The sealing assembly of claim 2, wherein a diameter of the base of the sleeve, the end cover, or both the end cover and the sleeve, is about 1.5 times an inner diameter of the projecting portion of the respective end cover or sleeve or greater.

7. The sealing assembly of claim 2, wherein the inner diameter of the projecting portion of the sleeve, the end cover, or both the end cover and the sleeve is about 15 mm or greater.

8. The sealing assembly of claim 2, wherein the diameter of the base of the sleeve, the end cover, or both the end cover and the sleeve is about 35 mm or greater.

9. The sealing assembly of claim 2, wherein the projecting portion of the end cover has a length from the first end to the second end of about 25 mm to about 75 mm.

10. The sealing assembly of claim 1, wherein the holder includes one or more apertures having a diameter of about 17.5 mm to about 45 mm.

11. The sealing assembly of claim 2, wherein the projecting portion of the sleeve has a length between the first end and the second end of about 1 mm to about 25 mm.

12. An apparatus for cleaning a sensor containing an electrical component comprising:
a sealing assembly comprising
an end cover having a first end and a second end, wherein the first end comprises an opening and the second end is fully enclosed, and a cavity extends from the opening towards the second end;
a sleeve having a first end and a second end, wherein the sleeve comprises an opening in the first end and an opening in the second end, and defines a cavity therebetween;
a sealing gasket; and
a sealing clamp;
wherein the cavity in the end cover and the cavity defined by the sleeve are aligned and configured to accept a component therein, and
a holder.

13. The apparatus of claim 12, wherein the holder comprises one or more apertures having a diameter of about 17.5 mm to about 45 mm.

14. The apparatus of claim 12, wherein the end cover further comprises a projecting portion having an outer diameter of about 17.5 mm to about 45 mm.

15. The apparatus of claim 12, wherein the end cover is releasably retained in an aperture of the holder.

16. A method for cleaning a component that requires a liquid-tight seal, comprising:
assembling a sealing assembly on a component by:
placing a component through a cavity in a sleeve having a first end and a second end, wherein the sleeve comprises an opening in the first end and an opening in the second end, where the cavity is defined therebetween;
placing a sealing gasket over a component;
placing a distal end of the component into a cavity in an end cover having a first end and a second end, where the first end comprises an opening and the second end is fully enclosed, where the cavity extends from the opening towards the second end; and
placing a clamp around the sleeve, the sealing gasket, and the end cover; and
wherein, after assembling the sealing assembly, the component is placed into an automated washer.

17. The method of claim 16, wherein the end cover is releasably retained in an aperture of a holder.

18. The method of claim 17, wherein the holder maintains the component in a generally horizontal position.

* * * * *